US 7,783,817 B2

(12) United States Patent
Sullivan, Jr. et al.

(10) Patent No.: US 7,783,817 B2
(45) Date of Patent: Aug. 24, 2010

(54) METHOD AND APPARATUS FOR CONDITIONAL BROADCAST OF BARRIER OPERATIONS

(75) Inventors: James Edward Sullivan, Jr., Cary, NC (US); Barry Joe Wolford, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 11/468,894

(22) Filed: Aug. 31, 2006

(65) Prior Publication Data

US 2008/0059683 A1 Mar. 6, 2008

(51) Int. Cl.
*G06F 13/36* (2006.01)
(52) U.S. Cl. .................. 710/310; 710/110; 710/311; 711/152
(58) Field of Classification Search ......... 710/306–316, 710/110; 711/152
See application file for complete search history.

(56) References Cited

U.S. PATENT DOCUMENTS

| | | | |
|---|---|---|---|
| 5,893,151 | A | 4/1999 | Merchant |
| 5,893,165 | A | 4/1999 | Ebrahim |
| 6,038,646 | A | 3/2000 | Sproull |
| 6,047,334 | A | 4/2000 | Langendorf et al. |
| 6,073,210 | A | 6/2000 | Palanca |
| 6,088,771 | A | 7/2000 | Steely, Jr. et al. |
| 6,247,102 | B1 * | 6/2001 | Chin et al. .................. 711/150 |
| 6,275,913 | B1 | 8/2001 | Jeddeloh |
| 6,370,632 | B1 | 4/2002 | Kikuta et al. |
| 6,385,705 | B1 | 5/2002 | Keller et al. |
| 6,609,192 | B1 | 8/2003 | Guthrie et al. |
| 6,708,269 | B1 * | 3/2004 | Tiruvallur et al. ........... 712/225 |
| 6,963,967 | B1 | 11/2005 | Guthrie et al. |
| 6,976,115 | B2 | 12/2005 | Creta et al. |
| 7,454,570 | B2 | 11/2008 | Dunshea et al. |
| 7,490,218 | B2 | 2/2009 | Eggers et al. |

(Continued)

FOREIGN PATENT DOCUMENTS

JP 04190435 7/1992

(Continued)

OTHER PUBLICATIONS

International Search Report-PCT/US07/077336, International Search Authority-European Patent Office-Jan. 31, 2008.

(Continued)

*Primary Examiner*—Mark Rinehart
*Assistant Examiner*—Nimesh G Patel
(74) *Attorney, Agent, or Firm*—Nicholas J. Pauley; Peter Kamarchik; Sam Talpalatsky

(57) ABSTRACT

A weakly-ordered processing system implements an execution synchronization bus transaction, or "memory barrier" bus transaction, to enforce strongly-ordered data transfer bus transactions. A slave device that ensures global observability may "opt out" of the memory barrier protocol. In various embodiments, the opt-out decision may be made dynamically by each slave device asserting a signal, may be set system-wide during a Power-On Self Test (POST) by polling the slave devices and setting corresponding bits in a global observability register, or it may be hardwired by system designers so that only slave devices capable of performing out-of-order data transfer operations participate in the memory barrier protocol.

17 Claims, 4 Drawing Sheets

U.S. PATENT DOCUMENTS

| | | |
|---|---|---|
| 2002/0184476 A1* | 12/2002 | McKenney .................. 712/225 |
| 2002/0194436 A1* | 12/2002 | McKenney .................. 711/152 |
| 2003/0131175 A1 | 7/2003 | Heynemann et al. |
| 2005/0273583 A1 | 12/2005 | Caprioli et al. |
| 2006/0026309 A1 | 2/2006 | Day et al. |
| 2006/0031621 A1* | 2/2006 | Riley et al. ................ 710/305 |
| 2006/0031844 A1 | 2/2006 | Dice et al. |
| 2006/0218335 A1* | 9/2006 | Hofmann et al. ........... 710/316 |
| 2006/0218358 A1 | 9/2006 | Hofmann et al. |
| 2007/0038793 A1* | 2/2007 | Wehage et al. ............. 710/305 |
| 2007/0214298 A1 | 9/2007 | Sullivan et al. |

FOREIGN PATENT DOCUMENTS

| | | |
|---|---|---|
| JP | 2009-269935 | 10/1997 |
| WO | 2005121948 | 12/2005 |
| WO | 2006102636 | 9/2006 |

OTHER PUBLICATIONS

Written Opinion-PCT/US07/077336, International Search Authority-European Patent Office-Jan. 31, 2008.

\* cited by examiner

METHOD AND APPARATUS FOR CONDITIONAL BROADCAST OF BARRIER OPERATIONS

BACKGROUND

The present invention relates generally to the field of computers and in particular to a method and apparatus for conditionally broadcasting memory barrier bus operations.

Computers and other electronic systems and devices perform computational tasks in a wide variety of applications. These systems and devices increasingly integrate functionality beyond straight computation, often by integrating a variety of independent, function-specific circuits or modules, such as processors, mathematical co-processors, video and graphics engines, DMA controllers, GPS receivers, dedicated compression or encryption circuits, and the like. High-bandwidth data transfer between such devices and memory, as well as between the devices themselves, is critical to achieving the desired level of performance. A data communication bus is a well-known structure providing a shared communication link between devices or modules in a processing system.

A common logical dichotomy of devices on a shared bus comprises "master" and "slave" devices. Master devices initiate bus transactions, and commonly arbitrate among themselves for access to the bus, and, in some systems, for a share of the bus bandwidth. Slave devices respond to data transfer bus transactions initiated by master devices, accepting data from the master device in response to write bus transaction and providing data to the master device in response to read bus transaction. Most slave devices execute data transfer operations in the order in which the corresponding bus transactions occur on the shared bus.

In many cases, system performance may be optimized by allowing data transfer operations—such as, for example, memory accesses—to be performed out of order. For example, a sequence of memory operations may be reordered to allow all operations to the same page in memory to be executed before a new page is opened. Processing systems that are allowed to re-order memory operations are generally referred to as "weakly-ordered" processing systems.

Conversely, processing systems that require memory operations to appear to be performed in the same order as their corresponding bus transactions are referred to as "strongly-ordered" processing systems. Note that slave devices in strongly-ordered systems may actually perform memory operations out of bus transaction order, so long as the memory state at any time appears to the processor(s) as if the memory operations had been performed in order. This characteristic is known as "global observability." Simple slave devices that always execute data transfer operations in the order received are inherently globally observable. Other slave devices that may execute data transfer operations out of order "snoop" the data transfer operation addresses, and execute data transfer operations to the same address in a bus transaction order. These types of slave devices are also globally observable. Slave devices that execute data transfer operations without regard to bus transaction order are not globally observable.

In some cases, even in weakly-ordered processing systems, data transfer operation order must be enforced to ensure correct operation. For example, an application may require a processor to write data to memory before the processor reads from that memory location. Reordering these operations would result in incorrect data being returned in the read operation.

Various conventional techniques have been employed for executing ordered data transfer operations in a weakly-ordered processing system. One technique is simply to delay a particular data transfer bus transaction until all data transfer operations before it are executed. In the previous example, the processor may delay issuing a read request until it receives an indication that guarantees that the write operation data has been written to the memory location. Halting program execution to enforce data transfer operation ordering obviously has a negative effect on performance.

Another technique for executing ordered data transfer operations in a weakly-ordered processing system is to define an execution synchronization bus transaction as part of the bus protocol, also known as a "memory barrier." A memory barrier is a bus transaction that ensures that all data transfer bus transactions issued by a master device prior to issuance of the memory barrier are executed, or appear to have been executed, before any data transfer bus transaction issued by the master device after the memory barrier. Any memory barrier is a bus transaction that does not involve any data transfer between master and slave devices. A memory barrier operation may be explicitly initiated by a master device. Alternatively, or additionally, a memory barrier operation may be generated by a bus controller in response to a strongly-ordered data transfer operation initiated by a master device. In the previous example, a memory barrier transaction could be issued by the processor before issuing the read bus transaction. The memory barrier would ensure that the write operation (as well as any other previously issued data transfer operation) is executed before the read operation is executed. Memory barriers are described in co-pending U.S. patent application, "Enforcing Strongly-Ordered Requests In A Weakly-Ordered Processing System," Ser. No. 11/253,307, filed Oct. 19, 2005, and assigned to the assignee of the present application, which is incorporated herein by reference in its entirety.

The memory barrier may be inefficient in processing systems with multiple slave devices. In such systems, to enforce an ordering constraint, a memory barrier transaction must be propagated to every slave device that can be accessed by the master device issuing a strongly-ordered data transfer bus transaction or memory barrier operation. An acknowledgment of the memory barrier must be received from each of the slave devices before the strongly-ordered the data transfer bus transaction, or bus transaction following a memory barrier operation, is issued. Thus, the delay imposed by the memory barrier is determined by the slowest slave device to respond. This may adversely affect performance, particularly where the slower slave devices perform data transfer operations in bus transaction order regardless of the memory barrier.

Co-pending U.S. patent application, "Minimizing Memory Barriers When Enforcing Strongly-Ordered Requests in a Weakly-Ordered Processing System," Ser. No. 11/254,939, filed Oct. 20, 2005 and assigned to the assignee of the present application, which is incorporated herein by reference in its entirety, discloses a system and method of dynamically minimizing memory barriers. A status register associated with each slave device indicates, on a per-master basis, whether the slave currently has a pending (unexecuted) data transfer operation from each master device from which the slave may receive data transfer bus transactions. If a particular slave device indicates that it does not have any pending data transfer operations from a particular master device, a memory barrier from that master device need not be propagated to that slave device. In this manner, memory barriers are propagated only where necessary to enforce bus transaction ordering. That is, the memory barrier is directed only to slave devices that have pending (previously issued) data transfer operations from the master device requiring a strongly-ordered data transfer bus transaction or memory barrier operation.

Most conventional systems include at least some slave devices that inherently provide global observability. With respect to such slave devices, there is no need to dynamically monitor whether the slave device has pending data transfer operations from a particular master to determine whether or not to direct a memory barrier transaction to the slave device.

SUMMARY

According to one or more embodiments disclosed herein, a slave device that ensures global observability many "opt out" of the memory barrier protocol. In various embodiments, the opt-out decision may be made dynamically by each slave device asserting a signal, may be set system-wide during a Power-On Self Test (POST) by polling status registers in the slave devices to ascertain their global observability, may be set by software, or it may be hardwired by system designers, so that only slave devices capable of performing out-of-order data transfer operations participate in the memory barrier protocol. This opt-out decision improves the system performance and reduces power consumption by only propagating memory barrier operations to slave devices as necessary, thus eliminating the delay associated with a memory barrier acknowledgment from a globally observable slave device.

One embodiment relates to a weakly-ordered processing system. The system includes a plurality of slave devices and two or more master devices, each configured to direct data transfer bus transactions to one or more slave devices. The system further includes a bus interconnect configured to implement data transfer bus transactions between master and slave devices, and further configured to direct an execution synchronization bus transaction to one or more slave devices that are not globally observable in response to a strongly-ordered data transfer bus transaction request from a master device.

Another embodiment relates to a bus interconnect operative to direct data transfer bus transactions from one or more master devices to two or more slave devices in a weakly-ordered processing system. The bus interconnect includes a bus register operative to queue data transfer bus transaction requests and a controller operative to control the issuance of data transfer bus transactions from the bus register and further operative to issue an execution synchronization bus transaction to one or more slave devices that are not globally observable in response to a strongly-ordered data transfer bus transaction request from a master device.

Yet another embodiment relates to a method of executing a strongly-ordered data transfer bus transaction in a weakly-ordered processing system including one or more master devices and two or more slave devices. An indication of which of the slave devices are globally observable is maintained. An execution synchronization bus transaction is issued to one or more slave devices that are not globally observable in response to a strongly-ordered data transfer bus transaction request from a master device.

DETAILED DESCRIPTION

The detailed description set forth below in connection with the appended drawings is intended as a description of various embodiments of the invention and is not intended to represent the only embodiments in which the invention may be practiced. In particular, for the purpose of explanation, embodiments are described with respect to a processing system comprising one or more processors issuing memory access requests to two or more memory controllers, and a bus interconnect. However, the invention is applicable to any master devices issuing data transfer bus transactions to slave devices in a shared bus system, and is not limited to processors and memory controllers.

Figure 1:
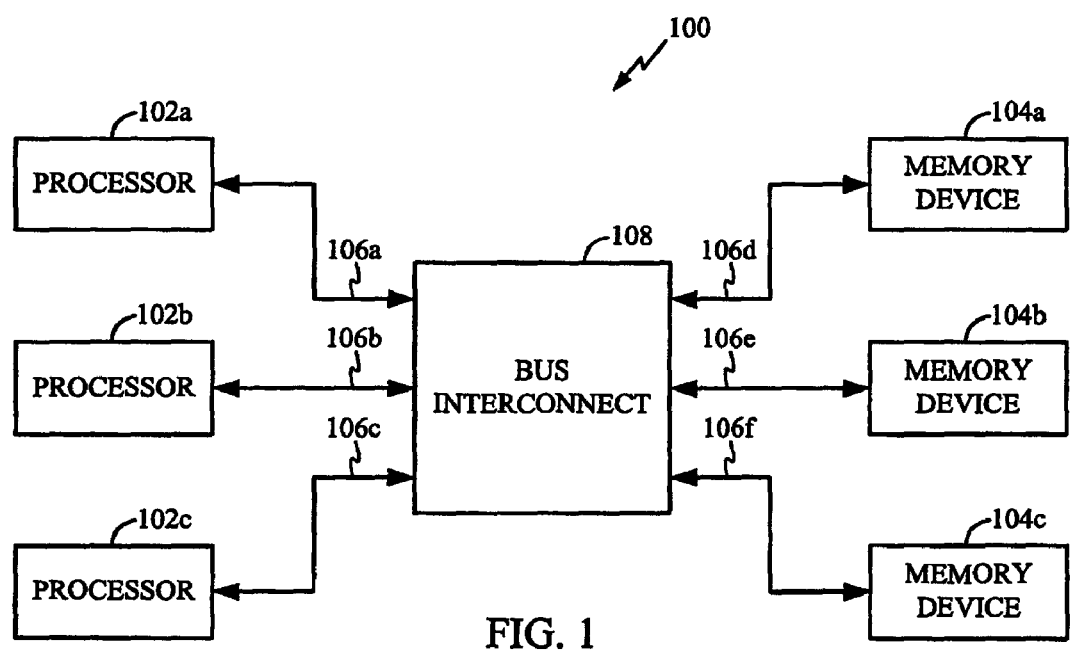
FIG. 1 is a functional block diagram of a weakly-ordered processing system.

FIG. 1 is a functional block diagram of a weakly-ordered processing system. The processing system 100 may be disposed of in a computer or other computational system, including a portable electronic device, embedded system, distributed system, or the like. The processing system 100 may be implemented as an integrated circuit, discrete components, or any combination thereof. Only those portions of the processing system 100 necessary for an explanation of embodiments of the present disclosure are depicted in FIG. 1. Those skilled in the art will recognize how best to implement the processing system 100 for each particular application.

The processing system 100, as depicted in FIG. 1, includes processors 102a-102c in communication with memory devices 104a-104c over a shared bus 106. The actual number of processors and memory devices required for any particular application may vary depending on the computational power required and the overall design constraints. A bus interconnect 108 may be used to manage bus transactions between the processors 102a-102c and memory devices 104a-104c using point-to-point switching connections. In at least one embodiment of the bus interconnect 108, multiple direct links may be provided to allow two or more bus transactions to occur simultaneously.

One or more of the processors 102a-102c may be configured to execute instructions under control of an operating system or other software. The instructions may reside in one or more of the memory devices 104a-104c. Data may also be stored in the memory devices 104a-104c, and retrieved by the processors 102a-102c to execute certain instructions. The new data resulting from the execution of these instructions may be written back into the memory devices 104a-104c. Each memory device 104a-104c may include a memory controller (not shown) and a storage medium (not shown), as known in the art.

Each processor 102a-102c may be provided with a dedicated channel 106a-106c on the bus 106 for communicating with the bus interconnect 108. Similarly, the bus interconnect 108 may use a dedicated channel 106d-106f on the bus to communicate with each memory device 104a-104c. By way of example, a first processor 102a can access a target memory device 104b by sending a data transfer bus transaction request over its dedicated channel 106a on the bus 106. The bus interconnect 108 determines the target memory device 104b from the address of the data transfer bus transaction request and issues a data transfer bus transaction to the target memory device 104b over the appropriate channel 106e on the bus 106. A data transfer bus transaction may be a write transaction, a read transaction, or any other bus transaction related to a data transfer. An originating processor 102a-102c may issue a write transaction to a target memory device 104a-104c by placing the appropriate address with a payload on the bus 106 and asserting a write enable signal. An originating processor 102a-102c may issue a read transaction to a target memory device 104a-104c by placing the appropriate address on the bus 106 and asserting a read enable signal. In response to the read request, the target memory device 104a-104c will send the payload back to the originating processor 102a-102c. An originating processor 102a-102c may also issue bus transactions that are not data transfer bus transactions, such as a memory barrier transaction.

In at least one embodiment of the processing system 100, the processors 102a-102c may transmit an attribute with each memory access request. The attribute may be any parameter that describes the nature of the data transfer bus transaction. The attribute may be transmitted with the address over the address channel. Alternatively, the attribute may be transmitted using sideband signaling or some other methodology. The attribute may be used to indicate whether or not the data transfer bus transaction request is strongly-ordered. A "strongly-ordered" request refers to a data transfer bus transaction request that cannot be executed out of order.

The bus interconnect 108 may monitor the attribute for each data transfer bus transaction request from the processors 102a-102c. If an attribute indicates a strongly-ordered data transfer bus transaction request, the bus interconnect 108 may enforce an ordering constraint on that transaction to every slave device that accepts bus transactions from that master and is capable of out-of-order execution of data transfer bus transactions, except for the slave device to which the strongly-ordered data transfer bus transaction is directed. By way of example, a data transfer bus transaction request from a first processor 102a to a target memory device 104a may include an attribute. The bus interconnect 108 may determine from the attribute whether the transaction is strongly-ordered. If the bus interconnect 108 determines that the transaction is strongly-ordered, it sends a memory barrier to every memory device 104b and 104c that the first processor 102a is capable of accessing and that may execute data transfer bus transactions out of bus transaction order, other than the target memory device 104a. The bus interconnect 108 also sends the strongly-ordered data transfer bus transaction to the target memory 104a without a memory barrier because the target memory device 104a will implicitly handle it as a strongly-ordered request due to the attribute associated with the data transfer bus transaction. Alternatively, the processor 102a may issue a memory barrier bus transaction prior to issuing the strongly-ordered data transfer bus transaction.

Figure 2:
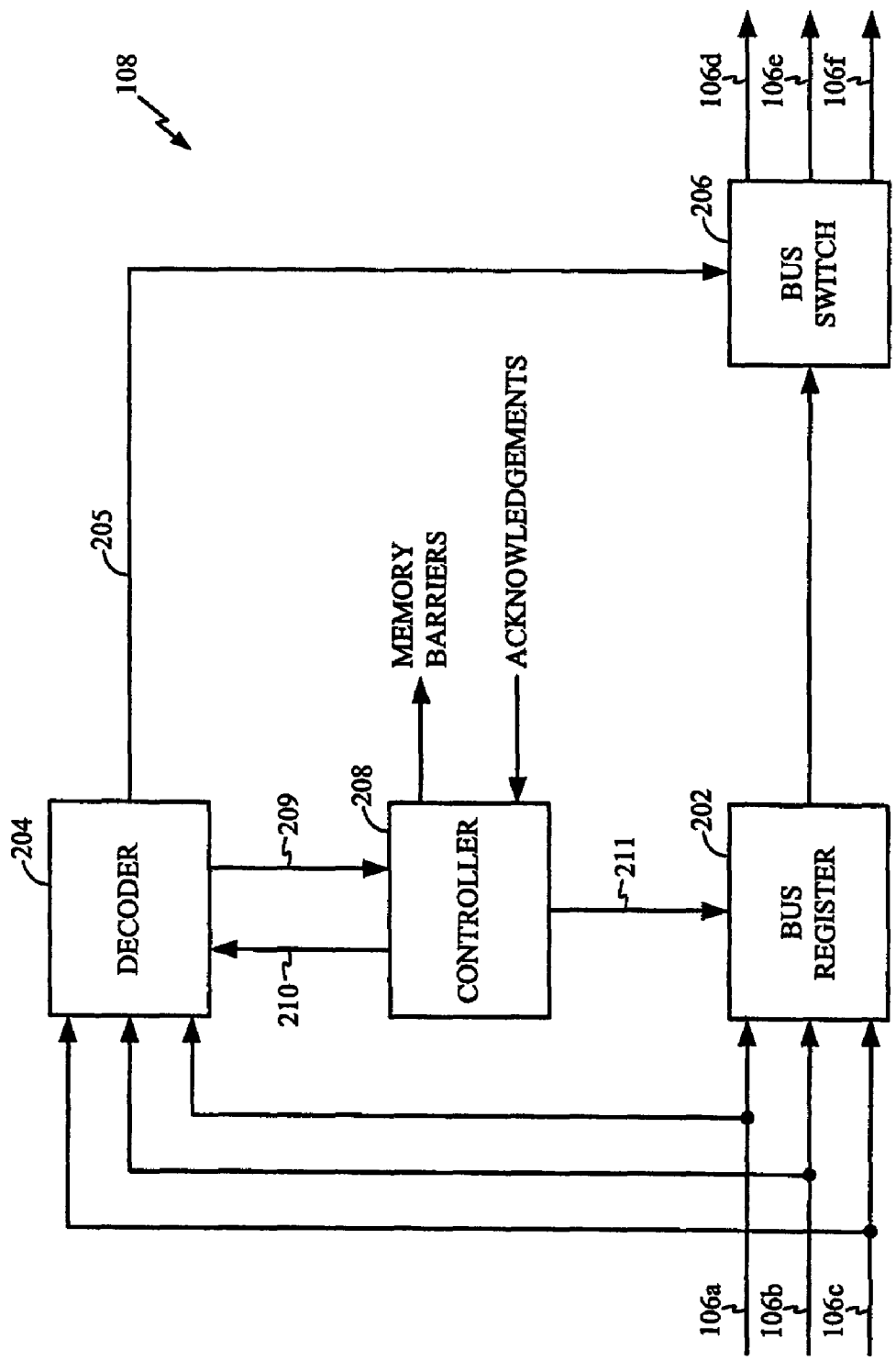
FIG. 2 is a functional block diagram of a bus interconnect in a weakly-ordered processing system.

FIG. 2 is a functional block diagram illustrating an example of a bus interconnect 108 in a weakly-ordered processing system. The manner in which the bus interconnect is actually implemented will depend upon design considerations. Those skilled in the art will recognize the interchangeability of various designs, and how best to implement the functionality described herein for each particular application.

Referring to FIG. 2, a bus register 202 may be used to receive and store information from the bus 106. The bus register 202 may be any type of storage device such as a First-In-First-Out (FIFO) memory, or other suitable storage device. The information received and stored by the bus register 202 may be any bus related information, but more specifically may include the address and attribute for each data transfer bus transaction request, and in the case of a write operation, the payload. The bus register 202 may also store the attribute in the case of a non-data transfer bus transaction such as a memory barrier operation issued by a master device. The address for each data transfer bus transaction request is also provided to a decoder 204. The decoder 204 may be used to determine the target memory device for each data transfer bus transaction request in the bus register 202. This determination is used to control a bus switch 206. The bus switch 206 is used to demultiplex each data transfer bus transaction from the bus register 202 to the appropriate channel of the bus 106 for its target memory device. A controller 208 may be used to control the timing of the data transfer bus transactions released from the bus register 202.

Figure 3:
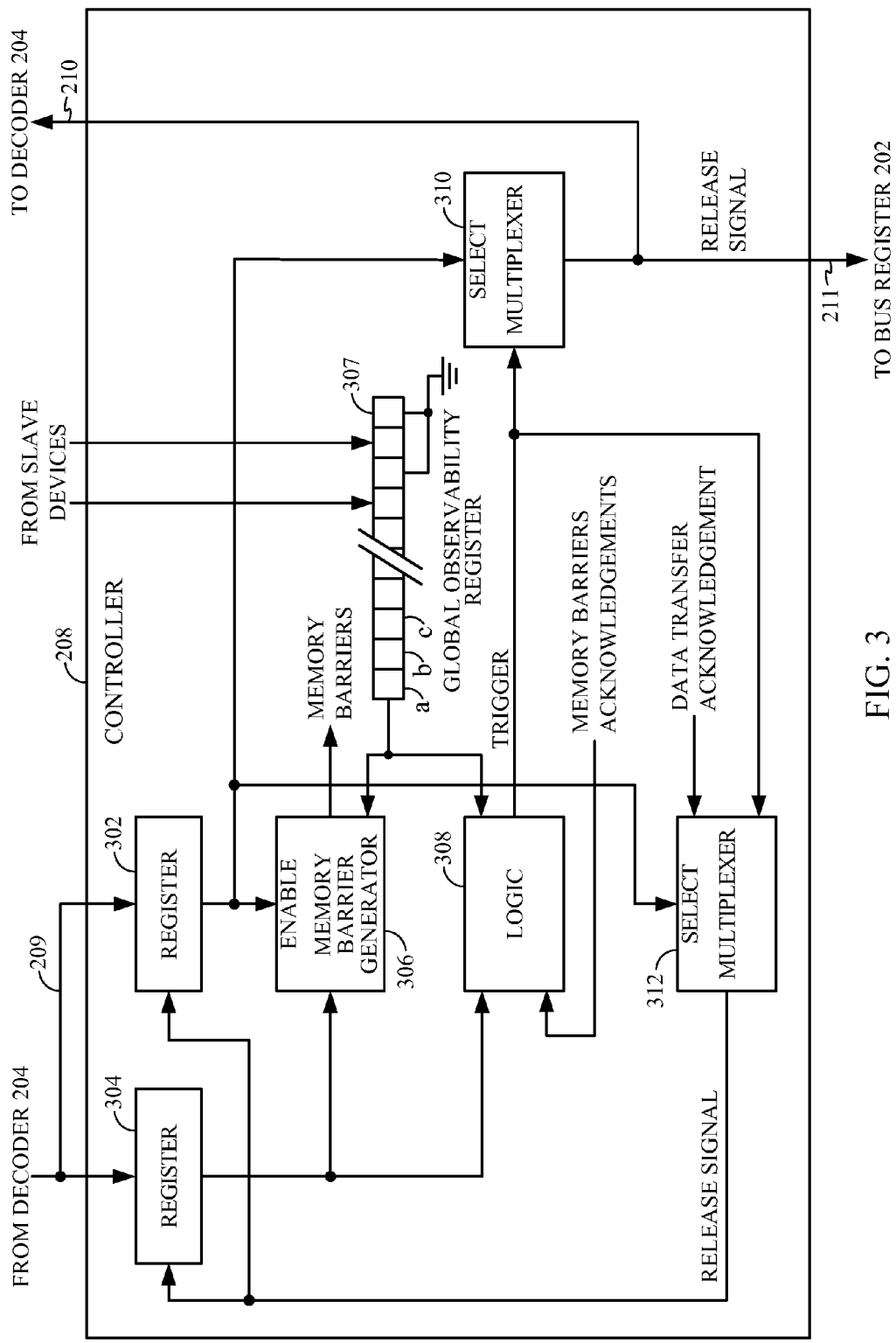
FIG. 3 is a functional block diagram of one embodiment of a controller in a bus interconnect for a weakly-ordered processing system.

FIG. 3 is a functional block diagram of one embodiment of a controller 208 in a bus interconnect 108 for a weakly-ordered processing system. The controller 208 enforces ordering constraints on memory operations based on information it receives from the decoder 204. The information may include the attribute for each bus transaction, which may be stored in a first input register 302. The information may also include data that identifies each memory device, other than the target memory device, that the originating processor is capable of accessing. The particular memory devices accessible by each processor are preconfigured during the design stage, and therefore, can be programmed or hardwired into the decoder 204. In any event, a second input register 304 may be used to store this information. The first and second input registers 302, 304 may be separate registers as shown in FIG. 3, or alternatively a single register. In some embodiments of the controller 208, the information from the decoder 204 may be stored in registers shared with other bus interconnect functions. Each register may be a FIFO or any other suitable storage medium.

The controller 208 enforces ordering constraints on data transfer operations by controlling the timing of data transfer bus transactions released from the bus register 202. The process will first be described in connection with an attribute which indicates that a strongly-ordered memory data transfer bus transaction is ready to be released from the bus register 202. In this case, the attribute is provided from the first input register 302 to a memory barrier generator 306 as an enabling signal. At the same time, the data stored in the second input register 304 is provided to the input of the memory barrier generator 306. As indicated above, the data stored in the second input register 304 includes data that identifies each memory device, other than the target memory device, that the originating processor is capable of accessing. When the memory barrier generator 306 is enabled by the attribute, this information is used to generate a memory barrier for each memory device identified by the data. Each memory barrier may be provided to the appropriate memory device by issuing a memory barrier transaction directed to the identified memory devices, with an attribute identifying the originating processor which initiated the strongly-ordered request. Alternatively, the memory barriers may be provided to the appropriate memory devices using sideband signaling, or by other suitable means. The memory barrier generator 306 may also generate memory barrier bus transactions in response to memory barrier bus transaction requests from a master device, which are also stored in the bus register 202, in a manner similar to that described above.

According to one or more embodiments, the memory barrier generator 306 may be used to suppress unnecessary memory barriers. For example, a memory barrier for a memory device accessible by the originating processor is superfluous, and may be suppressed, if the memory device is inherently globally observable. Globally observable slave devices may be identified in a number of ways.

In one embodiment of the controller 208, a logical global observability register 307 includes a bit for every slave device in the system. The state of the global observability register bit indicates whether the associated slave device is globally observable, and hence may be exempted from a memory barrier transaction. The global observability register 307 is an input to the memory barrier generator 306. The global observability register 307 may comprise a physical register set by system software during a Power On Self Test (POST), following a poll of slave devices to ascertain their behavior and capabilities with respect to global observability of bus transactions, such as by reading configuration status registers (CSRs) within the respective slave devices.

In one embodiment, which may be particularly advantageous in an ASIC or System On Chip (SOC) environment, one or more bits of a logical global observability register 307 may be hardwired by designers to a predetermined state indicating the known global observability of a corresponding slave device. This may reduce the complexity and execution time of the POST software.

In another embodiment, one or more bits of a logical global observability register 307 may comprise a dynamic, binary signal from a slave device. This allows the slave device to indicate periods of global observability. For example, a slave device may queue data transfer operations in a buffer, and execute the operations out of bus transaction order. When pending data transfer operations reside in the buffer, the slave device would indicate a lack of global observability, thus requiring memory barrier bus transactions be directed to the slave device if a processor issues a strongly-ordered data transfer bus transaction or memory barrier operation. However, if the buffer is empty, the slave device can guarantee global observability for at least the next occurring data transfer bus transaction (that is, the slave device guarantees that all data transfer operations previously issued to it have been executed). In this case, the slave device may indicate via the binary signal that it need not receive memory barrier transactions, and may maintain this indication only as long as its buffer is empty.

In any given implementation, the logical global observability register 307 may comprise any mix of one or more physical registers set by system software, hardwired bits, or dynamic signals from slave devices, as required or desired in a particular application.

Referring to FIGS. 1-3, an example will now be provided to illustrate the manner in which the global observability register bits can be used to suppress memory barriers. In this example, the processing system may be configured such that the first processor 102a can access the first, second, and third memory devices 104a, 104b, 104c. When a strongly-ordered data transfer bus transaction issued by the first processor 102a to the first memory device 104a (or alternatively when a memory barrier operation issued by the first processor 102a is at the output of the bus register 202), the corresponding attribute from the first input register 302 enables the memory barrier generator 306. The data provided to the memory barrier generator 306 from the second input register 304 identifies the memory devices, other than the target memory device, that the first processor 104a can access. In this case, the data identifies the second and third memory devices 104b, 104c. The memory barrier generator 306 checks the bits 307b, 307c in the logical global observability register 307 corresponding to the second and third memory devices 104b, 104c to determine whether either of memory device 104b, 104c is globally observable. In this example, bit 307b indicates global observability, and bit 307c does not. Accordingly, a memory barrier bus transaction is issued to the third memory device 104c, and the memory barrier to the second memory device 104b is suppressed.

Returning to FIG. 3, logic 308 in the controller 208 may be used to monitor feedback from the memory devices for memory barrier acknowledgements. A "memory barrier acknowledgement" is a signal from a memory device indicating that every data transfer operation from the processor requiring a strongly-ordered data transfer bus transaction or issuing a memory barrier operation, that preceded the memory barrier, has been executed. The data from the second input register 304 and the bits of the logical global observability register 307 are used by the logic 308 to determine which memory devices should be monitored for memory barrier acknowledgements. When the logic 308 determines that all necessary memory barrier acknowledgements have been received, it generates a trigger that is used to release the corresponding data transfer bus transaction from the bus register 202 (or the next pending data transfer bus transaction if the memory barrier operation was issued directly by the master device). More specifically, the attribute from the first input register 302 is provided to the input of a select multiplexer 310. The multiplexer 310 is used to couple the trigger generated by the logic 308 to the bus register 202 when the attribute indicates that the data transfer bus transaction is strongly-ordered. The release signal output from the multiplexer 310 is also coupled to the decoder to synchronize the timing of the bus switch 206 (see FIG. 2).

Once the data transfer bus transaction is released from the bus register, it is routed to the target memory device through the bus switch 206 (see FIG. 2). A second multiplexer 312 in the controller 208 may be used to delay the release of data from the first and second registers 302, 304 until a data transfer acknowledgement is received from the target memory device when an attribute indicating a strongly-ordered data transfer bus transaction or master device-issued memory barrier operation is applied to the select input. As discussed above, the attribute included in the bus transaction enforces an ordering constraint on the target memory device. Namely, the target memory device executes all outstanding data transfer operations issued by the originating processor before executing the strongly-ordered data transfer operation. A data transfer acknowledgement is generated by the target memory device following the execution of the strongly-ordered data transfer operation. The data transfer acknowledgement is fed back to the multiplexer 312 in the controller 208, where it is used generate a trigger to release new data from the first and second registers 302, 304 corresponding to the next data transfer bus transaction in the bus register 202. If the new data includes an attribute indicating that the corresponding data transfer bus transaction in the bus register 202 is strongly-ordered or comprises a master device-issued memory barrier operation, then the same process is repeated. Otherwise, the data transfer bus transaction can be released immediately from the bus register 202.

The controller 208 is configured to immediately release a data transfer bus transaction from the bus register 202 when the corresponding attribute in the first input register 302 indicates that the request is not strongly-ordered or a master device-issued memory barrier operation. In that case, the attribute disables the memory barrier generator 306. In addition, the attribute forces the multiplexer 310 into a state which couples an internally generated trigger to the bus register 202 to release the data transfer bus transaction. The data transfer bus transaction is released from the bus register 202 and coupled to the target memory device through the bus switch 206 (see FIG. 2). The data corresponding to the next data transfer bus transaction is then released from the first and second registers 302, 304 by an internally generated trigger output from the second multiplexer 312 in the controller 208.

Figure 4:
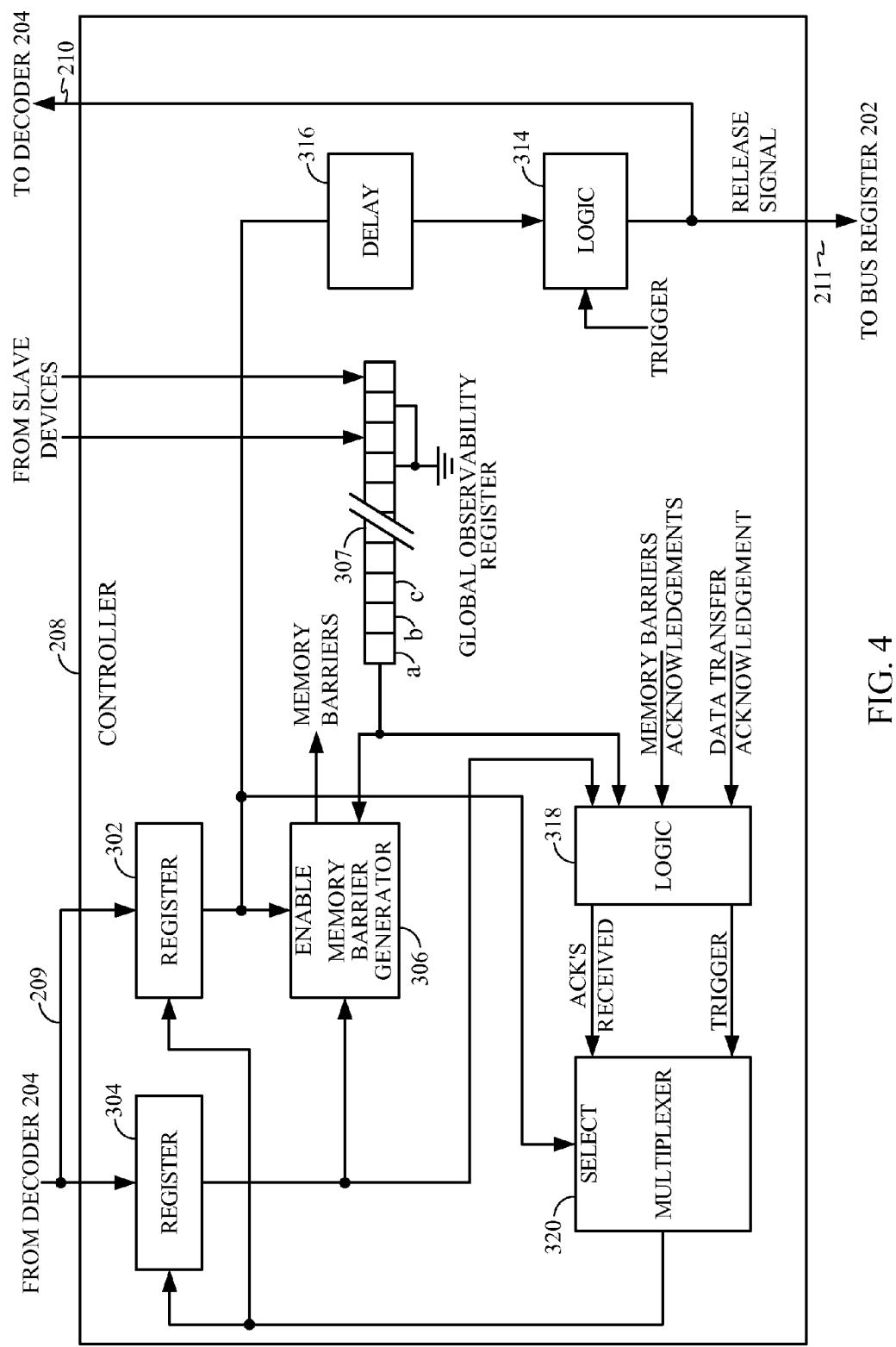
FIG. 4 is a functional block diagram of another embodiment of a controller in a bus interconnect for a weakly-ordered processing system.

FIG. 4 is a functional block diagram illustrating another embodiment of a controller in a bus interconnect for a weakly-ordered processing system. In this embodiment, a strongly-ordered data transfer bus transaction is released from the bus register 202 by the controller 208 at the same time the memory barriers are provided to the appropriate memory devices. More specifically, the first input register 302 is used to provide the attribute for a data transfer bus transaction to the memory barrier generator 306. If the attribute indicates that the corresponding data transfer bus transaction is strongly-ordered, then the memory barrier generator 306 is enabled. When the memory barrier generator 306 is enabled, the data from the second input register 304 is used to identify each memory device accessible by the originating processor, other than the target memory device. For each memory device identified, the memory barrier generator 306 checks the corresponding bit of the logical global observability register 307. A memory barrier is then generated for each memory device, other than the target memory device, that does not (at that time) indicate that it is globally observable.

With the memory barrier generator 306 enabled, logic 314 in the controller 208 may be used to prevent subsequent data transfer bus transactions from being released from the bus register 202 until the strongly-ordered data transfer bus transaction is executed by the target memory device. A delay 316 may be used to allow an internally generated trigger to release the strongly-ordered data transfer bus transaction from the bus register 202 before the trigger is gated off by the attribute. In this way, the data transfer bus transaction can be provided to the target memory device concurrently with the memory barriers for the remaining, non-globally observable memory devices accessible by the originating processor.

Logic 318 may be used to monitor feedback from the memory devices for the data transfer acknowledgement from the target memory device, and the memory barrier acknowledgements. The data from the second input register 304 and the bits of the logical global observability register 307 are used by the logic 318 to determine which memory devices need to be monitored for memory barrier acknowledgements. When the logic 318 determines that the various data transfer and/or memory barrier acknowledgements have been received, it generates a trigger to release new data from the first and second input registers 302, 304 corresponding to the next data transfer bus transaction in the bus register 202. The trigger is coupled through a multiplexer 320 which is forced into the appropriate state by the attribute from the first input register 202. If the new data includes an attribute indicating that the corresponding data transfer bus transaction in the bus register 202 is strongly-ordered, then the same process is repeated. Otherwise, the data transfer bus transaction can be released immediately from the bus register 202 with an internally generated trigger via the logic 314. An internally generated trigger may also be coupled through the multiplexer 320 to release the data from the first and second input registers 302, 304 for the next data transfer bus transaction in the bus register 202.

Although the present invention has been described herein with respect to a controller 208 within the bus interconnect 108 of a shared bus system, those of skill in the art will readily recognize that the invention is not limited to such implementation. In particular, the global observability indicator for each slave device may be propagated to or accessible by each master device, which may determine whether a memory barrier bus transaction is required, and if so, to which slave devices it should be directed.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A weakly-ordered processing system, comprising:
a plurality of slave devices;
at least one master device configured to direct data transfer bus transactions to one or more of the slave devices; and
a bus interconnect configured to implement data transfer bus transactions between master and slave devices, and further configured to direct an execution synchronization bus transaction to one or more of the slave devices that are not globally observable in response to an execution synchronization bus transaction request from the at least one master device;
wherein the bus interconnect includes a logical global observability register comprising a plurality of bits, each bit corresponding to a particular slave device and indicating whether the particular slave device maintains global observability;
wherein the logical global observability register comprises one or more physical registers set by system software during system initialization; and
wherein the system software polls configuration registers in the slave devices to ascertain their global observability.

2. The system of claim 1 wherein data transfer bus transaction requests from the at least one master device include an attribute indicating whether the data transfer bus transaction is strongly-ordered.

3. The system of claim 1 wherein each of the slave devices receiving the execution synchronization bus transaction executes previously received data transfer operations from the at least one master device issuing a strongly-ordered data transfer bus transaction request.

4. The system of claim 1 wherein one of the slave devices to which a strongly-ordered data transfer bus transaction request is directed appears to the at least one master device to have executed all previously received data transfer operations from the at least one master device issuing the strongly-ordered data transfer bus transaction request, prior to executing the strongly-ordered data transfer bus transaction request.

5. The system of claim 1 wherein the bus interconnect directs the execution synchronization bus transaction only to non-globally observable slave devices to which the at least one master device is configured to direct the data transfer bus transactions.

6. The system of claim 1 wherein the bus interconnect is further configured to direct the execution synchronization bus transaction to the one or more of the slave devices that are not globally observable in response to a strongly-ordered data transfer bus transaction request.

7. A bus interconnect operative to direct data transfer bus transactions from one or more master devices to two or more slave devices in a weakly-ordered processing system, comprising:
a bus register operative to queue data transfer bus transaction requests; and
a controller operative to control an issuance of the data transfer bus transactions from the bus register and further operative to issue an execution synchronization bus transaction to one or more of the slave devices that are not globally observable in response to an execution synchronization bus transaction request from one of the one or more master devices;

wherein the controller includes a logical global observability register indicating which of the slave devices are globally observable;

wherein the logical global observability register comprises a physical register set by system software; and wherein the system software polls status registers in the slave devices to ascertain a global observability of each of the slave devices, prior to setting the logical global observability register.

8. The bus interconnect of claim 7, further comprising a decoder logically connected to the controller and operative to ascertain to which of the slave devices a pending data transfer bus transaction is directed, and further operative to detect strongly-ordered data transfer bus transactions.

9. The bus interconnect of claim 8, further comprising a bus switch receiving the data transfer bus transactions from the bus register, the bus switch operative to direct the data transfer bus transactions to the slave devices under the control of the decoder.

10. The bus interconnect of claim 7 wherein the controller is further operative to issue the execution synchronization bus transaction to one or more of the slave devices that are not globally observable in response to a strongly-ordered data transfer bus transaction request.

11. A method of executing a strongly-ordered data transfer bus transaction in a weakly-ordered processing system including one or more master devices and two or more slave devices, comprising:

maintaining an indication of which of the slave devices are globally observable;

issuing an execution synchronization bus transaction to one or more of the slave devices that are not globally observable in response to an execution synchronization bus transaction request from at least one of the one or more master devices;

wherein maintaining an indication of which of the slave devices are globally observable comprises maintaining a logical global observability status register having bits corresponding to the slave devices;

polling status registers in the slave devices during initialization to ascertain a global observability of each slave device; and setting a physical global observability status register.

12. The method of claim 11 further comprising detecting a strongly-ordered data transfer bus transaction request by decoding an attribute of each data transfer bus transaction request received from the one or more master devices.

13. The method of claim 11 wherein the execution synchronization bus transaction is issued only to non-globally observable slave devices to which a particular one of the one or more master devices issuing a strongly-ordered data transfer bus transaction request may direct data transfer bus transactions.

14. The method of claim 11 wherein maintaining the indication of which of the slave devices are globally observable comprises receiving a dynamic binary signal from one or more of the slave devices indicating a global observability of the one or more of the slave devices.

15. The method of claim 11 further comprising, for each of the slave devices receiving the execution synchronization bus transaction, executing all pending data transfer operations from at least a particular one of the one or more master devices issuing a strongly-ordered data transfer bus transaction request.

16. The method of claim 11 further comprising, for one of the slave devices receiving a strongly-ordered data transfer bus transaction, executing all pending data transfer operations from at least a particular one of the one or more master devices issuing a strongly-ordered data transfer bus transaction request, prior to executing the strongly-ordered data transfer bus transaction.

17. The method of claim 11 further comprising:

receiving a strongly-ordered data transfer bus transaction request.

* * * * *